United States Patent Office 3,223,482
Patented Dec. 14, 1965

3,223,482
PROCESS FOR PRODUCING READILY DISPERSIBLE $SiO_2$ AND $Al_2O_3$ SOLIDS
Ira E. Puddington and Aurelio F. Sirianni, Ottawa, Ontario, Canada, assignors to National Research Council, Ottawa, Ontario, Canada, a corporation of Canada
No Drawing. Filed Aug. 12, 1964, Ser. No. 389,205
6 Claims. (Cl. 23—141)

This application is a continuation-in-part of U.S. application Serial No. 821,625 filed June 22, 1959, and now abandoned.

This invention relates to a method of producing finely divided, readily dispersible solids.

Various proposals have been made for preparing solids in a readily dispersible form for use in a variety of media. In one such method a silica aquagel in which the water has been replaced with a non-reactive solvent is heated in an autoclave at a temperature and pressure in excess of the critical temperature and pressure of the solvent. The vapor is allowed to escape from the autoclave after the critical temperature has been reached. Shrinkage or coalescence of the silica particles does not take place because the surface tension is zero while the liquid is evaporated. In another method, high temperature hydrolysis of a silica compound such as silicon tetrachloride is carried out to give silicon dioxide and the silica is collected on a cold surface. Such methods involve the use of expensive equipment and materials, and the product is necessarily costly.

Readily dispersible solids are of value in many fields. For example, the solid may be dispersed in paints where it serves as a pigment and a modifier of flow properties, in rubber where it provides reinforcement similar to carbon black, in lubricant greases where it acts as a thickening agent, in varnishes where it serves as a flatting agent, in carrier dusts where it acts as an anti-caking agent, and in floor waxes where it provides anti-slip properties.

A general object of the present invention is to provide an improved and economical method of producing readily dispersible finely divided solids from an aqueous dispersion of colloidal particles of silica or alumina.

A more specific object is to provide a method of producing discrete, dry, finely divided solids from a silica or alumina aquagel or aquasol by conditioning the individual solid particles thereof to prevent particle-particle adhesion which tends to cement the particles together.

Another object is to provide a method of producing easily pulverizable agglomerates of particles from silica or alumina aquagels or aquasols.

Another object is to provide a method of treating silica or alumina aquagels or aquasols to produce a mass of fine, dry, coated particles having a substantial degree of surface lubricity to provide a readily flowable mass of discrete, mutually non-adhesive particles.

The raw material for use in the method of this invention, is, as previously indicated, an aquagel or an aquasol, preferably in salt-free form, of only colloidal sized particles of silica or alumina.

Such an aquagel or aquasol may be formed by treating sodium silicate or sodium aluminate with an acid in accordance with conventional procedures, followed by thorough washing of the product to remove excess electrolyte. For instance, dilute sodium silicate solutions may be acidified with dilute sulphuric acetic, phosphoric or hydrochloric acid and, after settling, the firm gel is broken up, washed and filtered until substantially free of salt. Other suitable methods for forming the salt-free aquagel or aquasol raw material include electrodialysis and ion exchange. Of these methods, very satisfactory results have been obtained from the use of electrodialysis, the ultimate material remaining after the alkali metal has been removed being a substantially pure form of heavily hydrated silica or alumina.

Generally stated, the method of this invention comprises the steps of mixing with such an aquagel or aquasol a quantity of a conditioning agent having certain characteristics, as described hereinafter, and thereafter removing the water from the mixture while maintaining the conditioning agent on the surface of the silica or alumina particles. The conditioning agent functions to surround the individual silica or alumina particles in the gel or the sol with a coating which is partially hydrophobic and partially hydrophilic, the hydrophilic portion of the coating being attached to the surface of the particles while the hydrophobic portion is oriented outwardly from the particle surfaces. In one specific form of the invention the conditioning agent-coated particles of the gel or sol are dried and then subjected to an additional step of burning or ashing at elevated temperatures to thus produce dry discrete finely divided particles, or easily dispersible agglomerates thereof, and these particles or agglomerates are useful for many different commercial purposes. In modified and preferred form of the invention the conditioning agent is supplemented with a predetermined quantity of an extender and such coated particles may then be merely dried or dehydrated and are useful in this form, or these thus coated particles may be dried, and thereafter burned to a discrete particle or agglomerate form. The conditioning agent-coated particles are unusually receptive to modification of the particle surrounding envelope by combination with a variety of hydrophobic materials, hereinafter more completely described and designated as extenders, and this combination coating more efficiently maintains the particles in separate discrete relationship, both while the water is being removed and during burning or ashing. The burning or ashing step substantially completely removes the conditioner and/or extender from the surface of the particles, and the product of this form of the invention is a substantially pure silica or alumina particle in discrete or readily dispersible agglomerate form.

The method of this invention contemplates a plurality of optionally usable steps which produce a plurality of products, including readily dispersible solid silica or alumina particles or agglomerates having on their surfaces a predetermined quantity of conditioner, or readily dispersible particles or agglomerates of silica or alumina having on their surfaces a combination coating comprising conditioning agent and extending agent or readily dispersible solid particles or agglomerates of substantially pure silica or alumina which result from the burning of either of the above described intermediate particles or agglomerates. Irrespective of the particular method of this invention which is selected for use, the end product is a finely divided ultimate silica or alumina particle having a size in the range of about 5 to about 30 millimicrons average diameter; when, however, the product results from adding only conditioner to the silica or alumina aquagel or sol and the water only is removed therefrom the final product is normally in the form of agglomerates of substantially larger size than the ultimate particles which form them, and the same is true with respect to the product when both conditioner and extender are added to the starting silica or alumina aquagel or sol. In these cases it has been observed that the conditioner coated or conditioner-extended coated particles are readily added to oils or greases and have been found to be more advantageous for this purpose than the products of the process which includes the burning step. The products of the process which include the burning or ashing step are particularly useful in such uses as silicone rubber extenders, paper coatings, polyester resin gel coats, and the like.

The conditioning agents which have been found to be suitable for use in the method of this invention are materials which are water soluble and which volatilize at a temperature above 100° C. The conditioning agent should be substantially metal free and one which on volatilization and/or oxidation at an elevated temperature leaves substantially no ash, and which does not separate or cause the separate particles to coalesce during heating and volatilization.

Conditioning agents which have been found to be suitable for use comprise the ammonium and amine alcohol salts and the sorbitan and polyoxyethylene sorbitan esters of aliphatic and cyclo aliphatic carboxylic acids having 8–22 and preferably 12–18 carbon atoms, urea complexes of said acids having a molecular weight less than about 2000, and alkylphenol-polyoxyethylene ether adducts having molecular weights in the range of about 800 to about 2000. Acids which fall within the specified group are, by way of example, oleic, lauric, stearic, ricinoleic, naphthenic, tall oil acids, and oxidized and sulphonated hydrocarbon oils. In some instances, the conditioning agent is desirably formed in situ by incorporating the reacting compounds in appropriate equimolar proportions with the aquagel or aquasol. When the conditioning agent is to be used in conjunction with an extender it may be satisfactorily one which is water dispersible; nevertheless the water soluble conditioning agents are preferred even when the extender is employed.

The conditioning agents are more specifically illustrated by the following typical representatives thereof: ammonium oleate, polyoxyethylene sorbitan mono-oleate, sorbitan monostearate, polyoxyethylene propyleneglycol, monostearate, polyoxyethylene sorbitan tristearate, polyethylene sorbitan monostearate, ammonium ricinoleate, ammonium laurate, triethanolamine laurate, triethanolamine linoleate, sorbitan monolaurate, lecithin, alkylphenol-polyoxyethylene ether adducts, ammonium petroleum sulfonate, and the reaction product in situ of: ammonium hydroxide and tall oil acids; or ammonium hydroxide and lauric acid; or ammonium hydroxide and oleic acid; or ammonium carbonate and oleic acid; or urea and naphthenic acids; or urea and tall oil acids; or urea and oleic and naphthenic acids; or urea and oxidized hydrocarbon oil; or triethanol amine and naphthenic acids; or n-butyl diethanolamine and tall oil acids.

The expression "extender" as used herein and in the appended claims is intended to mean a liquid, substantially water insoluble, combustible material which in the presence of the above described conditioning agent is water dispersible and capable of uniform admixture therewith to form a stable mixture, which extender volatilizes only substantially about 100° C. The presence of the extender is particularly desirable when the method includes the burning or ashing step and in this case serves the additional function of insuring that the particles remain in separate discrete form as they are purified and freed from the film or envelope of conditioner and extender on each. The extender may be at least one of the group consisting of hydrocarbon oils, oxidized hydrocarbon oils, vegetable oils, organic synthetic lubricants, such as the dibasic acid esters and polyglycol ethers, and mono- and polyhydroxy alcohols which contain at least 8 carbon atoms. A preferred group of extenders includes the readily available and inexpensive oils such as transformer oil, heat-transfer oil, partially refined distillates or used lubricating oil, and unusually good results have been obtained from using oxidized hydrocarbon oil. Oxidized hydrocarbon oil contains a sufficient number of water soluble or water dispersible groups to render the oil readily dispersible in the silica or alumina gel or sol by vigorous stirring or agitation. It is also satisfactory to employ a non-oxidized hydrocarbon oil and oxidize it in the mixture by known procedures.

The following list of extender materials suitable for the purpose of the present invention is given by way of example: white mineral oil; heat transfer oil; lubricating oils which are either oxidized or unoxidized; castor oil; corn oil; linseed oil; palm oil; olive oil; peanut oil; soya bean oil; tall oils; di-(2-ethylhexyl) sebacate; di-(2-ethylhexyl) adipate; di-octyl phthalate; octyl alcohol; dodecyl alcohol; octadecyl alcohol; methoxy polyethylene glycols such as that available under the trade mark "Carbowax 550"; transformer oil which is either oxidized or unoxidized; and hydrocarbon oils which are either oxidized or unoxidized and having these physical constants:

| Hydrocarbon oil | API gravity | SUS viscosity |
| --- | --- | --- |
| A | | At 210° F., 150. |
| B | 18.9 | At 210° F., 107.5. |
| C | 20.5 | At 210° F., 56.3. |
| D | 16.5 | At 100° F., 82.3. |
| E | 16.0 | At 100° F., 187. |
| F | 23.2 | At 210° F., 77.2. |
| G | 28.0 | At 100° F., 146. |
| H | 20.7 | At 210° F., 174.1. |

API—American Petroleum Institute.
SUS—Saybolt Universal Seconds.

The hydrocarbon oil, when desired in oxidized form, may be oxidized in any suitable manner. A typically suitable laboratory procedure is the following: heat about 3 liters of oil to about 100° C., and, while stirring, add about 100 millilitres of acetone containing 0.1% potassium permanganate, dropwise. Thereafter bubble air through the oil at 130° C. for about 24 hours, and the product is an excellent hydrocarbon oil for use in this invention.

Ammonia and glycerol may be used as co-additives in forming the coating. It has been noted that glycerol improves the utility of ammonia soap conditioning agents and that ammonium hydroxide suppresses hydrolysis in such soaps. The hydrophobic material used as extender is usually more efficient when it contains some water-soluble or -dispersible functional groups, for instance, carboxylic acid or hydroxyl groups.

The use of urea has an additional advantage in that it is believed to effectively break down hydrogen bonding between the particles and the aqueous media and can be used in the absence of any surface-active agent other than oxidized oil. This combination of materials is very economical.

It has been found that in order to coat adequately the individual particles of the starting material silica or alumina aquagel or sol certain quantities of the conditioning agent and/or the extender should be employed. Satisfactory products are formed when, by weight, about 10 to 600 parts of conditioner and 0 to 600 parts of extender are admixed with 100 parts of the silica or alumina which is contained in the starting material aquagel or aquasol. Better results are obtained by using about 50 to about 200 parts of conditioner and 50 to 200 parts of extender to 100 parts of silica or alumina, and the best commercial results have been obtained by using about 50 parts conditioner and about 150 parts extender per 100 parts of silica or alumina when the product is to be pure, that is, obtained from burning the previously coated silica or alumina particles. When the product has a film or coating of conditioner-extender on the surface of the particles or agglomerates thereof, it is preferred that it contain about 25 parts conditioner and about 175 parts of extender per 100 parts of silica or alumina. There is no established upper limit for either the conditioner or extender, although in most instances no particular advantage has been found from the use of quantities in excess of about 300 parts conditioner-extender per 100 parts of silica or alumina. When no extender is employed it is preferred to use a quantity of at least about 50 parts conditioner per 100 parts of silica or alumina in the aquagel or aquasol advantageously should be used. When the conditioner is employed together with the extender, their sum is preferably at least about 100 parts by weight per 100 parts of the silica or alumina in the aquagel or aquasol.

The method of this invention, broadly stated, comprises the step of mixing the conditioner and/or extender with the selected aquagel or aquasol starting material with sufficient vigor to insure the thorough homogenization of the ingredients and the separate coating or encapsulation of the individual ultimate silica or alumina particles thereof to thus produce a stable emulsion. It is satisfactory to first add the conditioning agent or to simultaneously add both the conditioner and the extender to the aquagel or aquasol so long as the degree of agitation is sufficient to thoroughly homogenize the mixture. This uniform admixture may be obtained by the use of a colloid mill, a motor driven stirrer, or other means for obtaining such dispersions which are well known to those skilled in the art. After thorough mixing the water is then removed from the emulsion such as by heating to evaporate the water. If the water is to be removed by heating, the temperature must of course be maintained below the volatilization temperature of the conditioner or extender. It will be appreciated that the major part of the water may be removed by other procedures, such as by freezing, thawing and filtering the mass. In the latter procedure, the hydrophobic coating will remain on the original colloidal silica or alumina particles during the treatment and protect them from irreversible agglomeration.

When the water is removed by evaporation, it is advantageous to agitate the dispersion during the evaporation period to expose fresh interfaces. The stirrer employed for the blending of the mixture may be heated to effect the evaporation step. During the latter stages of evaporation, the system may form granules approximately spherical in shape and may be handled as a reasonably free flowing solid. In this state the solid is in virtually the same physical condition as it was in the original aquagel or aquasol except that the solid is suspended in the conditioner or conditioner-extender.

Alternatively, a drum drier may be employed for evaporating the water very quickly from the emulsion. The coated particles are thereby obtained in the form of powder, thin flakes or the like. The coating separates the particles physically from one another.

The adhering coating of conditioner or conditioner plus extender remains on the individual silica or alumina particles and insures no cementing, collapsing or shrinkage of the mass during drying, or drying and burning. The coated product may range from dry-appearing fine powder to slightly agglomerated powder to a pasty mass depending upon the quantities of conditioner and extender present within the above given ranges. The components of the coating may be initially selected so as to be compatible with the solvent or fluid medium in the grease, paint, wax, etc. with which it is desired to admix the colloidal silica or alumina of this invention. These coated products are non-dusting and easy to handle. In some instances it may be desirable to remove the surface active conditioner but leave the extender coating. For instance the conditioner can be an ashless soap which will volatilize or decompose at a temperature at which the extender remains largely unaffected. The extender may also be modified in situ after the water removal—to leave a more desirable coating e.g. by controlled oxidation. In many instances, it may be desirable to remove the coating from the particles. For instance, removal of the coating generally improves the thickening ability of the particles in most applications.

After removal of the water the mass may be heated to about 350° C. to 700° C. This purified product is a finely divided, readily dispersible substantially pure silica or alumina particulate material. The preferred maximum temperature for the burning step of the process is about 440° C., since there is considerable evidence to show that some irreversible dehydration and some sintering or surface glazing may occur at higher temperatures, particularly in the case of the silica product, which tends to cause a decrease in the thickening efficiency of the particles and an increase in their size and/or density. However, temperatures above 440° C. and of up to about 700° C. can be tolerated for short periods, for example, several hours, if care is taken to ensure that the desired bulk density is achieved. The bulk density of agglomerates produced by these recited steps is within the range of about 17 lbs. to about 2.5 lbs. per cubic foot, from the compact to the fluffy agglomerates respectively.

The burning step may be conducted in any suitable furnace. It may be conveniently carried out on a large scale in a fluidized bed. It is possible to control the fluidized bed characteristics to result in loosely bound agglomerates which are readily dispersed into the colloidal sized particles.

Metals originating from organic compounds left with the aquagel or aquasol should be avoided since they may promote sintering and surface glazing to the product during the burning stage. Traces of certain inorganic salts of alkali metals such as trisodium phosphate, are beneficial however when hydrocarbon oils are used since such a salt aids in the in situ oxidation of the hydrocarbon (formation of water-dispersible groups) and prevents varnish formations originating from the hydrocarbon oil during the burning process. Organic peroxides may also be used to aid in situ oxidation.

A sensitive method for determining the desired usefulness of the product of the present invention is to disperse it in a suitable vehicle such as a hydrocarbon mineral oil by means of a shearing device such as a colloid mill. If a grease structure is obtained free from gritty or abrasive matter, the product is considered to be good. The desired silica will give a transparent grease with a clear hydrocarbon oil. Oil dispersions containing 10–15% solids by weight which are gritty and remain fluid are considered failures. The presence of gritty and abrasive matters is readily detected by the fingers when a small amount of the grease material is rubbed on a smooth surface portion of the hand.

It will be recognized that the method according to the present invention is more conveniently carried out and is much less expensive than known methods utilizing solvent exchange or autoclaving procedures. It is evident from the following examples that inexpensive raw materials may be used, a simple technique may be employed, and low cost equipment is available for carrying out the present process.

The following examples are illustrative of the method and product of the invention and the results obtained by it:

*Example 1*

The water was evaporated off at 100° C. from a wet dispersion containing the following ingredients:

| | | |
|---|---|---|
| Silica aquagel from electrodialysed sodium silicate | g | [1] 2,000 |
| Ammonium oleate | g | 80 |
| Ammonium hydroxide | cc | 100 |
| Heat transfer oil | g | 100 |

[1] 108 g. solid.

The residue was burned over an open flame and finally ashed at 475° C. for 7 hours. Bulk density of the product was 12.7 lbs./cu. ft.

10% of the product by weight dispersed in 90% 300 viscosity SUS 40 VI (viscosity index) lubricating oil by means of a colloid mill produced a hard grease free of gritty material.

Example II

The water was evaporated off at 100° C. from a wet dispersion containing the following ingredients:

| | | |
|---|---|---|
| Silica aquagel (obtained by precipitating sodium silicate solutions with H₂SO₄, then washed substantially free of sulfates) | g-- | [1]50.0 |
| Triethanolamine laurate | g-- | 1.0 |
| Ammonium hydroxide | cc-- | 5.0 |
| Heat transfer oil | g-- | 5.0 |

[1] 3.0 g. solid.

The water residue was burned over a flame and ashed at 475° C. for 46 hours. Bulk density of the product was 13.4 lbs./cu. ft.

10% of the ashed product by weight dispersed in 90% 300 viscosity SUS, 40 VI lubricating oil by means of a colloid mill produced a smooth paste which did not flow under its own weight.

Example III

The water was evaporated off at 100° C. from a wet dispersion containing the following ingredients:

| | | |
|---|---|---|
| Silica aquagel obtained from dialysed sodium silicate solutions | g-- | [1]50.0 |
| Ammonium ricinoleate | g-- | 1.0 |
| Ammonium hydroxide | cc-- | 5.0 |
| Oxidized SAE 30 lubricating oil | g-- | 5.0 |

[1] 5.2 g. solid.

The anhydrous residue was burned over a flame, then ashed at 500° C. for 6 hours. Bulk density of the product was 13.5 lbs./cu. ft.

10% of the product by weight dispersed in 90% 300 viscosity SUS 40 VI lubricating oil by means of a colloid mill produced a hard paste free of gritty material.

Example IV

The water was evaporated off at 100° C. from a wet dispersion containing the following ingredients:

| | | |
|---|---|---|
| Silica aquagel (precipitated sodium silicate with H₂SO₄) | g-- | [1]30 |
| Sorbitan monolaurate | g-- | 0.5 |
| Ammonium hydroxide | cc-- | 5 |
| Oxidized SAE 30 lubricating oil | g-- | 5 |

[1] 3.2 g. solid.

The dried residue was burned over a flame, then ashed at 500° C. for 6 hours. Bulk density was 14.3 lbs./cu. ft.

10% of the product by weight dispersed in 90% 300 viscosity SUS 40 VI lubricating oil by means of a colloid mill produced a hard paste free of gritty particles.

Example V

The water was evaporated off at 100° C. from a wet dispersion containing the following ingredients:

| | | |
|---|---|---|
| Silica aquagel (dialysed sodium silicate solution) | g-- | [1]50 |
| Polyoxyethylene sorbitan monostearate | g-- | 0.5 |
| Ammonium hydroxide | cc-- | 5 |
| SAE 30 lubricating oil | g-- | 5 |

[1] 4.7 g. solid.

The dried compact unctuos residue was burned over a flame and ashed at 500° C. for 6 hours. Bulk density was 14.9 lbs./cu. ft.

10% of the product by weight dispersed in 90% 300 viscosity SUS 40 VI lubricating oil by means of a colloid mill produced a rather hard paste free of gritty material.

Example VI

The water was evaporated off at 100° C. from a wet dispersion containing the following ingredients:

| | | |
|---|---|---|
| Silica aquagel (dialysed) | g-- | [1]100 |
| Ammonium laurate | g-- | 4 |
| Ammonium hydroxide | cc-- | 5 |
| Oxidized transfomer oil | g-- | 5 |

[1] 7.2 g. solid.

After the water was evaporated off at about 100° C., the residue was burned over a flame and finally ashed at 500° C. for 3 hours. Bulk density of this material was 12 lbs./cu. ft.

The silica was added to lubricating oil in the following proportions:

| | Percent by weight |
|---|---|
| Compact silica | 10 |
| 300 viscosity 40 VI oil | 90 |

A rigid paste was obtained after homogenizing the slurry with a colloid mill.

Example VII

The water was evaporated off at about 100° C. from a wet dispersion containing the following ingredients:

| | G. |
|---|---|
| Silica aquagel | [1]100 |
| Polyoxyethylene sorbitan monostearate | 2 |
| Octyl alcohol (extending agent) | 5 |

[1] 5.0 g. solid.

The residue was burned over an open flame and finally ashed 2 hours at 450° C. The bulk density of this product was 12.5 lbs./cu. ft.

The silica was added to lubricating oil in the following proportions:

| | Percent by weight |
|---|---|
| Compact silica | 10 |
| Oil (300 viscosity 40 VI) | 90 |

After passing the slurry through a colloid mill a hard grease resulted.

Example VIII

The water was evaporated off at 100° C., from a wet dispersion containing the following ingredients:

| | G. |
|---|---|
| Aluminium hydroxide aquagel | [1]100 |
| Polyoxyethylene sorbitan monostearate | 5 |
| SAE 30 hydrocarbon oil | 5 |

[1] 7.0 g. solid.

The residue was ignited over a flame and finally ashed at 500° C. for several hours. Bulk density was 12 lbs./cu. ft.

The alumina was added to lubricating oil in the following proportions:

| | Percent by weight |
|---|---|
| Compact alumina | 10 |
| 300 viscosity 40 VI oil | 90 |

After homogenizing the slurry with a colloid mill, a rigid paste was obtained.

Example IX

| | | |
|---|---|---|
| Dialysed silica aquagel pH 3.75 | g-- | [1]500 |
| Ammonium hydroxide | ml-- | 36 |
| Tall oil acids | g-- | 36 |
| Oil A | g-- | 100 |

[1] ≈16 g. SiO₂.

The ammonium hydroxide was added first to the silica aquagel, then the tall oil was reacted in situ. To the homogeneous dispersion was added the hydrocarbon oil and the water was stripped off at about 100° C. A viscuous fluid system was obtained. After burning the hydrocarbon coating over an open flame and whitening the material at 410° C., a very fluffy form of finely divided silica having a bulk density of about 2.5 lb./cu. ft. was obtained.

A dispersion containing 10% of the silica and 90% SAE 10 oil by weight produced a paste by mixing with a spatula.

Example X

| | |
|---|---|
| Dialysed silica aquagel pH 5.5 | [1]240 g. |
| Ammonium hydroxide | 25 ml. } solution. |
| Water | 100 ml. |
| Tall oil acids | 24 g. |
| Oxidized SAE 30 lubricating oil | 25 g. |

[1] ≈15.6 g. $SiO_2$.

Ingredients were mixed as in Example IX. A coated silica product was obtained after substantially all of the water was removed. The organic material was removed by ashing at 410° C.

A hard paste was obtained when a slurry containing 10% $SiO_2$ and 90% SAE 10 oil was homogenized with a colloid mill.

Example XI

| | G. |
|---|---|
| Dialysed silica aquasol pH 3.75 | [1]200 |
| Reaction product of $NH_4OH$ and lauric acid | 30 |
| Oxidized SAE 30 lubricating oil | 20 |

[1] ≈6.1 g. $SiO_2$.

The ingredients were thoroughly mixed in situ and the water was boiled off at about 100° C. The very viscous fluid was burned over a flame and left in the furnace at about 390° C. for 48 hours. A very fine free flowing silica product having a bulk density of 6.3 lb./cu. ft. was obtained.

A dispersion containing 7.5% of this $SiO_2$ in 92.5% mineral oil sold under the trade name "Stanolax Medium" gave a transparent and good grease structure after passing several times through a colloid mill.

Example XII

| | | |
|---|---|---|
| Dialysed silica aquegel | g | [1]1,010 |
| Ammonium hydroxide | ml | 15 |
| Tall oil acids | g | 50 |
| Oil B (not oxidized) | g | 130 |

[1] ≈39 g. $SiO_2$.

The ammonium hydroxide was added to silica aquagel, then the tall oil was dispersed in the slurry followed by the hydrocarbon oil. The water was removed while stirring the system at about 100° C. A liquid slurry was obtained. After burning and ashing at about 475° C. for several hours the silica was tested for dispersibility.

A dispersion of 10% $SiO_2$ and 90% SAE 10 oil had the consistency of a soft grease after passing the slurry several times through the colloid mill.

Example XIII

Same as Example XII except that oxidized oil C was used. After the water was removed by evaporation at about 100° C. an oil coated powder resulted. This heavily coated material was burned over an open flame and ashed at 475° C. for 2 hours. The finely divided white amorphous silica was tested for its oil thickening efficiency by passing through the colloid mill a slurry consisting of 10% silica in 90% SAE 10 oil by weight. A hard transparent grease resulted. This is indicative that oil having water dispersible constituents aids in the peptization of the solid particles and thus reduces irreversible particle-particle adhesions.

As is shown by Examples XII and XIII oils which have active functional water dispersible groups produced by oxidizing the hydrocarbon oil are preferable to non-oxidized oil.

Example XIV

| | G. |
|---|---|
| Silica aquasol pH 2.5 | [1]400 |
| Urea | 4 |
| Naphthenic acid | 10 |
| Oil D (oxidized) | 60 |

[1] ≈13 g. $SiO_2$.

The urea was added to a silica aquasol and thoroughly mixed. The naphthenic acid was then added, followed by the oxidized oil. After the water was removed by evaporation at about 100° C. the coated product was burned over an open flame and finally the remaining carbonaceous material was removed at 400° C. overnight. A fluffy form of colloidally sized amorphous silica having a bulk density of about 4 lb./cu. ft. was obtained.

A dispersion of 10% of this $SiO_2$ and 90% SAE 10 oil produced an unctuous paste after homogenizing through a colloid mill.

Example XV

| | G. |
|---|---|
| Dialysed silica aquagel pH 3.75 | [1]400 |
| Urea-naphthenic acid complex | 25 |
| Oxidized hydrocarbon oil (recovered) | 80 |

[1] ≈39.5 g. $SiO_2$.

A mixture consisting of 60 g. urea and 315 g. napthenic acid were reacted together at about 120° C. for several hours. A viscous fluid comprising a urea-naphthenic acid complex was obtained by this reaction.

This urea-napthenic acid complex was added to the silica aquagel and mixed thoroughly in a mixing machine. Then the recovered oxidized oil was added. The slurry was transferred to a large beaker and the water was removed by heating at about 100° C. The heavily coated silica was burned over an open flame and whitened at 400° C. in a muffle furnace.

A slurry consisting of 10% silica by weight in 90% SAE 10 lubricating oil produced an unctuous transparent hard paste after passing through a colloid mill.

Example XVI

| | | |
|---|---|---|
| Dialysed silica aquagel pH 5.7 | kg | [1]12.3 |
| Urea | g | 100 |
| Ammonium hydroxide | ml | 15 |
| Oleic acid | g | 45 |
| Naphthenic acid | g | 125 |
| Oil D | g | 500 |
| Oxidized "Stanolax Medium" | g | 1,500 |

[1] ≈502 g. $SiO_2$.

The silica aquagel was broken up in a mixing machine and the urea was added. To the syrupy system was then added the ammonium hydroxide followed by the acids. After thorough mixing the hydrocarbon oil was added and the mixture heated at about 100° C. to remove the water. The hard almost powdery paste was burned over an open flame and finally ashed at 435° C. overnight.

An unctuous transparent paste was obtained by passing a slurry containing 10% silica and 90% SAE 10 oil by weight through a colloid mill.

Example XVII

| | G. |
|---|---|
| Dialysed silica aquagel pH 5.0 | [1]300 |
| Triethanolamine | 2.0 |
| Naphthenic acid | 2.8 |
| Oil D | 60 |

[1] ≈12.6 g. $SiO_2$.

The triethanolamine was dissolved in about 10 ml. water and thoroughly mixed with the silica aquagel. This was followed by the naphthenic acid and the hydrocarbon oil. The water was evaporated off at about 100° C. then the coated silica burned over an open flame and finally whitened at 400° C. in a muffle furnace. A very fluffy finely divided amorphous silica having a poured bulk density of 7.7 lb./cu. ft. was obtained.

An unctuous transparent paste was obtained when 10% $SiO_2$ and 90% SAE 10 lubricating oil by weight were homogenized by passing through a colloid mill.

Example XVIII

The silica aquagel used in this example was obtained by acidifying N grade sodium silicate with dilute sulfuric acid. After setting the gel was broken up, washed and filtered about 7 times with distilled water at 35–40° C. The substantially salt free silica was treated as follows:

| | G. |
|---|---|
| $H_2SO_4$ pptd. silica aquagel pH 5.75 | [1] 300 |
| Urea | 10 |
| Naphthenic acid | 20 |
| Oil E (oxidized) | 120 |

[1] ≈28 g. $SiO_2$.

The urea was dissolved with about 25 ml. of water and added to the silica aquagel and after mixing to a syrupy consistency the naphthenic acid was added followed by the oil. The water was removed by evaporation at about 100° C. while mixing the suspension with a motor stirrer. The heavily coated silica was burned over an open flame and then whitened in a muffle furnace at 400° C. overnight. The product obtained after breaking the aggregates for 10 seconds in a Waring Blendor had a poured bulk density of 5.6 lb./cu. ft.

A dispersion of 10% $SiO_2$ in 90% by weight SAE 10 oil was prepared. After passing this thick slurry through a colloid mill a hard transparent unctuous paste resulted.

*Example XIX*

| | G. |
|---|---|
| $H_2SO_4$ precipitated silica aquagel pH 5.75 | [1] 400 |
| Urea | 8 |
| Naphthenic acid | 17.5 |
| Oxidized Oil E | 25 |
| Preparation sold under trademark "Varsol" (as diluent) | 75 |

[1] ≈30 g. $SiO_2$.

The urea was dissolved in about 20 ml. water and added to the silica aquagel. After mixing, the naphthenic acid was added to the syrupy system followed by the oxidized oil and the "Varsol." The water was stripped off at about 100° C. and substantially all of the "Varsol" at about 140° C. A coated powder was obtained, and after burning it over an open flange and ashing at about 400° C. overnight white compacts of finely divided silica resulted. A dispersion of 10% $SiO_2$ in 90% by weight SAE 10 oil was made. An unctuous transparent paste was obtained after passing this thick slurry several times through a colloid mill.

*Example XX*

| | | |
|---|---|---|
| $H_3PO_4$ precipitated silica aquagel pH 7.3 | g-- | [1] 750 |
| Ammonium hydroxide | ml-- | 30 |
| Oleic acid technical | g-- | 40 |
| Oil F | g-- | 80 |

[1] ≈42 g. $SiO_2$.

The silica aquagel used in this example was prepared by acidifying sodium silicate solutions with ortho-phosphoric acid in the following manner. 600 g. sodium silicate were diluted with 2 litres water. The solution was acidified with a solution of 100 g. ortho-phosphoric acid diluted with 800 ml. water. The acid solution was added to the sodium silicate and the system gelled quickly. The pH of the aquagel was about 7.0–7.3. After standing overnight, the aquagel was broken up with 2 litres water and filtered. This treatment was repeated three more times.

The ammonium hydroxide was added to the silica gel and mixed in a mixing machine, then the oleic acid added. A firm gelatinous system was obtained. While mixing, the thick oil was added and the water removed by evaporation at about 100° C. A point is reached near the end of the evaporation of water where spherules are obtained. By stopping the stirring at this stage the heavily coated spherically shaped agglomerates may be ashed without losing their spherulite form. It is not necessary to evaporate all the water content at this stage and the material may be transferred to an electrically heated furnace where the evaporation of water and the combustion of hydrocarbon coating may be carried out at about 400° C. The spherical silica agglomerates had a poured bulk density after gentle tapping of about 12.5 lb./cu. ft. The surface of these agglomerates are not glazed and they are easily pulverized to a fluffy form of finely divided amorphous silica. After dispersing the dry solids for several seconds in a Waring Blendor, the material had a poured bulk density of about 8.8 lb./cu. ft. When handled manually this silica is not prone to dusting and it disperses with ease in a hydrocarbon liquid media.

10% agglomerated silica from this example was dispersed in 90% by weight of an SAE 10 lubricating oil by means of a colloid mill. A hard transparent unctuous paste was obtained.

A similar looking compact commercial silica had a poured bulk density of about 45 lb./cu. ft. but it did not pulverize nor disperse in hydrocarbon liquid media to give unctuous pastes.

*Example XXI*

| | | |
|---|---|---|
| $H_3PO_4$ precipitated silica aquagel (as in Example XX) | g-- | [1] 700 |
| Urea | g-- | 10 |
| Naphthenic acid | g-- | 40 |
| Ammonium hydroxide | ml-- | 10 |
| Oil F | g-- | 80 |

[1] ≈41 g. $SiO_2$.

The urea was dissolved in about 25 ml. water and was added to the silica aquagel. After mixing in a mixing machine naphthenic acid, ammonium hydroxide and the hydrocarbon oil were added. The heating was started and the water was evaporated off. When spherical agglomerates of various diameters (4 mm. to 1 mm.) were obtained the stirring was stopped and the contents were transferred to a vertical furnace. The evaporation of water was completed and the organic material removed at about 410° C. The agglomerates maintained their spherical shape, did not dust easily, and had a poured bulk volume of about 11.9 lb./cu. ft.

A slurry containing 10% $SiO_2$ (from the spherical agglomerates) and 90% by weight SAE 10 lubricating oil was passed through a colloid mill. An unctuous transparent hard paste resulted.

A still much cheaper process for making colloidally sized amorphous silica contemplates the use of acid hydrocarbon oils or oils prone to oxidation, possessing or being capable of forming during the reaction process sufficient number of water dispersible groups which has the dual function of reacting with the urea and the silica. The water may be removed by evaporation under these conditions without shrinking the silica to a material which will not thicken oils.

As far as it could be ascertained from X-ray diffraction patterns the system containing a judicious quantity of urea and acid oils permits the colloidal silica to change to a substantially platelet like shape after removal of the protective substances. The change in geometry of the colloidal silica usually necessitates a higher solid concentration than is shown in the previous examples, in order to obtain a grease-like consistency when dispersed in a hydrocarbon oil media. Free flowing coated amorphous silica can be obtained after the water is removed by reducing the quantity of acid oil used. This coated silica is easily redispersible in a highly refined lubricating oil to give unctuous transparent hard pastes at about 9–13% solid content by weight. These greases possess also a limited degree of water repellency.

Examples XXII, XXIII, and XXIV illustrate the operation of this process for the formation of very inexpensive coated silica and pure silica both possessing oil thickening properties.

The materials were agitated in situ in a Hobart mixer for about 10–15 minutes then heated while stirring to evaporate the water at about 100° C. The coating surrounding the discrete silica particles was burned off over a flame. The final ashing was continued in a muffle furnace at 550° C. for ¾ hour. The silica product had a poured bulk density of the order of 10 lb./cu. ft. A dispersion containing 10% silica by weight in 90% SAE 10 oil produced a transparent paste when homogenized by means of a colloid mill.

*Example XXXI*

| | |
|---|---|
| Silica aquagel _____gm__ | ¹263 |
| Oleic acid _____gm__ | 18 |
| Ammonium hydroxide _____ml__ | 10 |
| Sulfonated crude oil _____gm__ | 20 |

¹ ≈18 gm. SiO₂.

The ingredients were mixed in situ in a Hobart mixer for several hours. The water was evaporated by passing the hard slurry through a drum drier heated by steam at a pressure of 29 lbs./sq. in. The drying operation required several minutes. The flake-like coated material was ashed at about 430° C. overnight. A dispersion containing 10% silica by weight in 90% SAE 10 lubricating oil produced a transparent paste when passed through a colloid mill.

*Example XXXII*

| | Gm. |
|---|---|
| Silica aquagel pH 3.2 _____ | ¹400 |
| Tall oil _____ | 32 |
| Urea _____ | 3 |

¹ ≈16 gm. SiO₂.

The ingredients were homogenized in a Waring Blendor and the water was evaporated by passing the suspension through a drum dryer heated by steam at 29 lbs./sq. in. After passing through a colloid mill a mixture of 5 gm. coated silica (≈about 10.5% SiO₂) and 10 gm. SAE 10 lubricating oil, a transparent hard paste was obtained.

*Example XXXIII*

| | Gm. |
|---|---|
| Silica aquagel, pH 3.2 _____ | ¹200 |
| Oleic acid _____ | 1 |
| Ammonium carbonate _____ | 0.2 |
| Oil (G) oxidized _____ | 12 |

¹ ≈8 gm. SiO₂.

The ingredients were dispersed in situ and the water was evaporated by passing the suspension through a drum drier heated by steam at a pressure of 29 lbs./sq. in. The coated silica in the form of a powder was ashed at about 430° C. overnight. The silica had poured bulk density of 10.6 lbs./cu. ft. A transparent paste was obtained when a slurry containing 10% of the product in 90% SAE 10 lubricating oil by weight was homogenized by means of a colloid mill.

*Example XXXIV*

| | Gm. |
|---|---|
| Silica aquagel, pH 3.2 _____ | ¹200 |
| Palmitic acid _____ | 6 |
| Ammonium carbonate _____ | 1.12 |
| Di-octyl phthalate _____ | 20 |

¹ ≈8 gm. SiO₂.

The mixture was thoroughly dispersed and the water was evaporated on a drum drier heated by 29 p.s.i. steam pressure.
A suspension consisting of 7.2 gm. coated silica (≈about 8.2% SiO₂) obtained after drum drying and 12.8 gm. SAE 10 oil produced a hard transparent paste when homogenized by means of a colloid mill. The remaining drum dried material was ashed at about 430° C. overnight. The poured bulk density of the ashed material was about 6.5 lbs./cu. ft. A dispersion composed of 10% SiO₂ by weight and 90% SAE 10 oil produced a hard transparent paste when homogenized by means of a colloid mill.

*Example XXXV*

4536 grams of silica equagel containing 15.1% or 685 grams of silica and 685 grams of tall oil fatty acids and 600 grams ammonium hydroxide were uniformly mixed into the aquagel. The water was evaporated by passing the mixture over a drum dryer. The flake-like coated silica was placed in an oven and burned for 4 hours at 510° C. The dry, white silica product was cooled and used to prepare a dispersion containing 10% silica 90% of a 300-second neutral lubricating oil, by weight, to produce a stiff grease.

*Example XXXVI*

6804 grams of silica aquagel containing 12.5%, or 852 grams of silica, 426 grams of ammonium hydroxide, 426 grams of tall oil fatty acids, and 1278 grams of a 50-second neutral hydrocarbon oil were thoroughly homogenized and then passed over a drum dryer to remove the water. A portion of the coated silica was burned in an open flame and then ignited in a muffle furnace at 700° C. for 2 hours. The dry, white silica obtained formed a hard grease when 10% was blended into 90% by weight of a 300-second neutral lubricating oil.

*Example XXXVII*

4536 grams of silica aquagel containing 9.4%, or 426 grams of silica, 150 grams of ammonium hydroxide, and 212 grams of oleic acid were mixed thoroughly. 638 grams of a 300-second neutral oil was added and thoroughly mixed and homogenized. This mixture was passed over a drum dryer to remove the water. 150 grams of this coated silica was mixed into 300 grams of a 300-second neutral hydrocarbon oil to form a smooth, hard grease containing about 11% SiO₂.

*Example XXXVIII*

4536 grams of a silica aquagel containing 9.4% or 426 grams of silica, 75 grams of ammonium hydroxide, and 106 grams of oleic acid were mixed, and 744 grams of a 300-second neutral lubricating oil was added, mixed and homogenized. This mixture was passed over a drum dryer heated with steam to remove water. 150 grams of this coated silica was mixed into 300 grams of a 300-second neutral oil to form a hard smooth grease containing about 11% SiO₂.

*Example XXXIX*

2268 grams of a silica aquagel containing 10.0% or 227 grams of silica, 100 grams of lecithin, and 650 grams of a 300-second neutral lubricating oil were mixed and homogenized. This mixture was passed over a drum dryer to remove the water. 151 grams of the coated silica was mixed into 182 grams of a 300-second neutral petroleum oil, to form a firm water-proof grease containing about 11% SiO₂.

*Example XXXX*

| | G. |
|---|---|
| Silica aquagel, pH 1.8 _____ | ¹200 |
| Petroleum sulfonic acid produced by American Cyanamid Company under the trade name "Aero Promoter 825" _____ | 8 |
| Ammonium Carbonate _____ | 2 |
| Oil (I) _____ | 20 |

¹ ≈12 g. SiO₂.

The ingredients were thoroughly mixed in a Waring Blendor. The water was evaporated off on a drum drier heated by 29 p.s.i. steam pressure. The coated silica was ashed at 430° C. overnight.
The silica product had a poured bulk density of 8.2 lbs./cu. ft. A suspension containing 12% of the silica product by weight in 88% SAE 10 lubricating oil produced a transparent paste when homogenized by means of a colloid mill.

Example XXII

| | G. |
|---|---|
| HCl precipitated silica aquagel | [1] 400 |
| Urea | 32 |
| Oil G (oxidized) | 150 |

[1] ≈31.0 g. $SiO_2$.

The urea was dissolved in about 50 ml. water and added to silica aquagel. After thorough mixing the acid oil was added and the homogeneous system was heated at about 100° C. to remove the water. The paste-like residue was burned over an open flame and whitened at about 400° C. The agglomerated product was agitated for 10 seconds in a Waring Blendor and a poured bulk density of the order of 4 lb./cu. ft. was obtained.

A dispersion of 10% $SiO_2$ in 90% by weight of an SAE 10 oil was made. This slurry appeared to thicken when mixed with a spatula; however when homogenized by passing through a colloid mill, a soft transparent unctuous paste was obtained. Increasing the solid content to 14.3% resulted in a hard transparent unctuous paste after passing the slurry through the colloid mill.

Example XXIII

| | G. |
|---|---|
| Dialysed silica aquagel pH 5.5 | [1] 400 |
| Urea | 15 |
| Oil G (oxidized) | 30 |

[1] ≈26 g. $SiO_2$.

The urea was dissolved in about 25 ml. water and added to the islica aquagel. The hydrocarbon oil was added after thorough mixing. The slurry was heated and most of the water was evaporated at about 100° C. The last traces of water were removed by evaporation by spreading in a thin layer over a tray. A fluffy coated silica was obtained.

A dispersion of 5.5 g. (=10% $SiO_2$) coated silica and 14.5 g. additional oil (SAE 10) was made. After homogenizing in a colloid mill an unctuous transparent paste was obtained.

Example XXIV

| | G. |
|---|---|
| Dialysed silica aquagel pH 5.5 | [1] 400 |
| Urea | 20 |
| Oil H | 30 |

[1] ≈29 g. $SiO_2$.

The urea was dissolved with about 30 ml. water and added to the silica aquagel and thoroughly mixed with a mixing machine. The oil was added and the mixing continued until about ½ of the water was evaporated and the drying completed at about 100° C.

A dispersion of 6 g. of coated powdered silica (=11% $SiO_2$) in 14 g. SAE 10 oil was made. After homogenizing with a colloid mill a very unctuous hard grease resulted.

Example XXV

In this example an oil prone to oxidation and ammonium hydroxide are used.

| | | |
|---|---|---|
| Dialysed silica aquagel pH 5.5 | g | [1] 250 |
| Ammonium hydroxide | ml | 20 |
| Oil D | g | 75 |
| Manganese oleate | g | [2] 0.2 |

[1] ≈13.7 g. $SiO_2$.
[2] As oxidation catalyst for hydrocarbon oil.

The water was boiled off at about 100° C. The fluid system was homogenized by passing through a colloid mill; the soft slurry was burned over a flame and ashed overnight at 400° C. A fluffy form of amorphous silica having a poured bulk density of about 5 lb./cu. ft. was obtained.

A dispersion of 14.3% $SiO_2$ in 85.7% by weight SAE 10 hydrocarbon lubricating oil was made. When this dispersion was homogenized by means of a colloid mill a hard transparent unctuous paste was obtained.

Example XXVI

| | Gm. |
|---|---|
| Silica aquagel pH 2.3 | [1] 550 |
| Ammonium ricinoleate | 24 |
| Castor oil (low viscosity) | 24 |

[1] ≈20 gm. silica.

After the water was evaporated off, a coated free-flowing powder was obtained. This product would be suitable as a thixotropic or viscosity modifying agent in paints (e.g. alkyds). The coating also has some drying oil properties.

Example XXVII

| | Gm. |
|---|---|
| Silica aquagel pH 5.2 | [1] 100 |
| Ammonium ricinoleate | 5 |
| Castor oil | 30 |

[1] ≈6 gm. $SiO_2$.

The water was boiled off and the residue was ashed at abut 400° C. The fluffy silica obtained yielded an excellent grease-like structure when 10% of the material by weight was homogenized with an SAE 10 lubricating oil. Bulk density of the silica product was 0.109 gm./cc. (=7 lbs./cu. ft.).

Example XXVIII

Reaction product of n-butyl diethanolamine and tall oil acids as conditioning agent.

| | Gm. |
|---|---|
| Silica aquagel dialysed pH 2.3 | [1] 600 |
| n-Butyl diethanolamine | 8 |
| Tall oil acids | 16 |
| Oil (G) oxidized | 60 |

[1] ≈24 g. $SiO_2$.

These ingredients were throroughly homogenized in situ, and the water was evaporated from the suspension at about 100° C. with stirring in order to expose fresh interfaces. Mixing was stopped when the material was obtained in the form of spherical agglomerates of about 3–5 mm. diameter. The coated silica was ashed at about 430° C. overnight. The silica obtained had a bulk density of about 7.5 lbs./cu. ft. A suspension containing 10% of the ashed product in 90% by weight of an SAE 10 lubricating oil produced a transparent paste when dispersed by means of a colloid mill.

Example XXIX

Complex of urea and tall oil acids as conditioning agent:

| | Gm. |
|---|---|
| Silica aquagel pH 2.3 | [1] 540 |
| Urea | 5 |
| Tall oil acids | 20 |
| Oil (G) oxidized | 60 |

[1] ≈21 gm. $SiO_2$.

The ingredients were agitated in situ in a Hobart mixer for about 10 minutes before commencing the evaporation of water by heating the slurry at about 100° C. The material was ashed at 430° C. A silica product having a poured bulk density of 6.2 lb./cu. ft. was obtained. The material had good thickening properties when dispersions were prepared with fresh oil similar to Example XXVIII.

Example XXX

Alkylphenol-polyoxyethylene adduct as conditioning agent:

Silica aquagel pH 3.0—510 gm. (≈26 gm. $SiO_2$)

Alkylphenol-polyoxyethylene adduct (that sold under the trademark "Triton X305" by Rohm & Haas Co.):

| | Gm. |
|---|---|
| Mol. wt. about 1500 | 20.3 |
| Oil (G) oxidized | 60 |

What is claimed is:

1. A method of producing finely divided discrete solids which comprises the steps of (1) admixing with a substantially salt-free aqueous dispersion of colloidal particles selected from the group consisting of silica and alumina, at least about 50%, by weight, of a conditioning agent selected from a group consisting of the ammonium and amine alcohol salts and the sorbitan and polyoxyethylene sorbitan esters of aliphatic and cycloaliphatic carboxylic acids containing from 8 to 22 carbon atoms, the urea complexes of said acids having a molecular weight less than about 2000, and alkyl phenol-polyoxyethylene ether adducts having a molecular weight in the range of about 800 to about 2000, said conditioning agent having a volatilization temperature above about 100° C., (2) agitating said mixture sufficiently to form a coating of said conditioning agent on said particles, (3) removing the water from said mixture to form a substantially water-free mass of conditioning agent-coated particles, and (4) heating said water-free mass at a temperature in the range of about 350° C. to about 700° C. until said coating is substantially completely burned from the surface of said particles.

2. A method in accordance with claim 1 wherein said colloidal particles are silica.

3. A method of producing finely divided discrete solids which comprises the steps of (1) admixing with a substantially salt-free aqueous dispersion of colloidal particles selected from the group consisting of silica and alumina, at least about 50%, by weight, of a conditioning agent selected from a group consisting of the ammonium and amine alcohol salts and the sorbitan and polyoxyethylene sorbitan esters of aliphatic and cycloaliphatic carboxylic acids containing from 8 to 22 carbon atoms, the urea complexes of said acids having a molecular weight less than about 2000, and alkyl phenol-polyoxyethylene ether adducts having a molecular weight in the range of about 800 to about 2000, said conditioning agent having a volatilization temperature above about 100° C., and per each 100 parts of said colloidal particles, up to about 600 parts by weight of an extender selected from the group consisting of hydrocarbon oils, vegetable oils, oxidized hydrocarbon oils, dibasic acid esters, and polyglycol ethers and alcohols containing at least 8 carbon atoms, said extender being substantially water insoluble and volatilizable substantially above about 100° C., (2) agitating said mixture sufficiently to form a coating of said conditioning agent on said particles, and (3) removing the water from said mixture to form a substantially water-free mass of conditioning agent-extender-coated particles, and heating said water-free mass at a temperature in the range of about 350° C. to about 700° C. until said coating is substantially completely burned from the surface of said particles.

4. A method in accordance with claim 3 wherein said colloidal particles are silica.

5. A method for producing finely divided, discrete, dry, solid particles having a bulk density less than about 17 lbs. per cubic foot, which comprises the steps of (1) admixing with a substantially salt-free aqueous dispersion of colloidal particles selected from the group consisting of alumina and silica, about 5% to about 100%, by weight of said particles, of a conditioning agent selected from the group consisting of the ammonium and triethanolamine salts and the sorbitan and polyoxyethylene sorbitan esters of an acid selected from the group consisting of oelic, lauric, stearic and ricinoleic acids, (2) agitating said mixture sufficiently to form a coating of said conditioning agent on said particles, (3) removing the water from said mixture to thereby form a substantially water-free mass of particles coated with said conditioning agent, and (4) thereafter heating said mass at a temperature in the range of about 350° C. to about 500° C. until said coating is burned from the surface of said particles.

6. A method for producing finely divided, discrete dry solid particles having a bulk density less than about 17 lbs. per cubic foot, which comprises the steps of (1) admixing with a substantially salt-free aqueous dispersion of colloidal particles selected from the group consisting of alumina and silica, a conditioning agent selected from the group consisting of the ammonium and triethanolamine salts and the sorbitan and polyoxyethylene sorbitan esters of an acid selected from the group consisting of oleic, lauric, stearic and ricinoleic acids, an extending agent selected from the group consisting of hydrocarbon oils and oxidized hydrocarbon oils, said conditioning agent and said extending agent each having a volatilization temperature above about 100° C. and being present in said mixture in a total amount in the range of about 5% to about 100%, by weight of said particles, (2) agitating the said mixture sufficiently to form a coating of said conditioning agent and said extending agent on said particles, (3) removing the water from said mixture to thereby form a substantially water-free mass of particles coated with said conditioning agent and said extending agent, and (4) thereafter heating said mass at a temperature in the range of about 350° C. to about 500° C. until said coating is burned from the surface of said particles to thereby form discrete particles having a bulk density of less than about 17 lbs. per cubic foot.

References Cited by the Applicant
UNITED STATES PATENTS

| | | | |
|---|---|---|---|
| 993,913 | 5/1911 | Tone | 23—182 |
| 2,835,606 | 5/1958 | Ladd | 117—6 |
| 2,894,851 | 7/1959 | Booth et al. | 117—6 |
| 2,924,510 | 2/1960 | Allen | 23—182 |
| 3,041,140 | 6/1962 | Alexander | 23—182 |
| 3,148,026 | 9/1964 | Roderburg | 23—182 |

MAURICE A. BRINDISI, *Primary Examiner.*